United States Patent [19]

Kammerlander et al.

[11] Patent Number: 4,667,202

[45] Date of Patent: May 19, 1987

[54] MOBILE RADIO NETWORK

[75] Inventors: Karl Kammerlander, Wolfratshausen; Anton Haderer, Gilching; Hans-Juergen v. d. Neyen, Munich, all of Fed. Rep. of Germany

[73] Assignee: Siemens Aktiengesellschaft, Berlin and Munich, Fed. Rep. of Germany

[21] Appl. No.: 653,704

[22] Filed: Sep. 24, 1984

[30] Foreign Application Priority Data

Sep. 28, 1983 [DE] Fed. Rep. of Germany ....... 3335128

[51] Int. Cl.$^4$ ............................. G01S 3/02; H04B 1/00
[52] U.S. Cl. ....................... 342/457; 455/33; 455/56
[58] Field of Search ............... 343/457, 394, 396; 455/33, 31, 53, 54, 56; 179/2 EB

[56] References Cited

U.S. PATENT DOCUMENTS

| 3,714,650 | 1/1973 | Fuller et al. | 343/394 |
|---|---|---|---|
| 3,803,610 | 4/1974 | Hastings et al. | 343/396 |
| 3,848,254 | 11/1974 | Drebinger et al. | 343/457 |
| 3,889,264 | 6/1975 | Fletcher | 343/394 |
| 4,025,853 | 3/1977 | Addeo | 455/33 |
| 4,144,409 | 3/1979 | Utano et al. | 455/33 |
| 4,144,496 | 3/1979 | Cunningham et al. | 455/33 |
| 4,229,620 | 10/1980 | Schaible | 455/31 |
| 4,310,722 | 1/1982 | Schaible | 455/33 |
| 4,398,063 | 8/1983 | Hass et al. | 455/33 |
| 4,435,840 | 3/1984 | Kojima et al. | 455/33 |

Primary Examiner—Theodore M. Blum
Assistant Examiner—D. Cain
Attorney, Agent, or Firm—Hill, Van Santen, Steadman & Simpson

[57] ABSTRACT

A mobile radio network comprises a plurality of base stations in a mutual three-dimensional arrangement in the manner of a cellular system. A respective, rigidly prescribed plurality of immediately adjacent, neighboring radio zones forms a radio zone group in which the frequency channels available are repeated. A problem area occurs in the design of radio zones in that the ground-bound radio propagation dependent on terrain and the nature of the built-up area leads to irregular field intensity distributions and radio zone boundaries; however, the radio zones must be designed according to the distributions of the radio traffic density. A solution for the traffic-qualified radio zone boundary is provided which is best suited for the detection of radio zone boundaries. The identificaiton of the radio zone boundary of two mutually-adjacent radio zones as a criterion for the transfer of mobile subscribers into a different radio zone is provided through a relative range measurement as a comparison of the distance of a mobile subscriber from two or more base sections and an evaluation of the phase difference of their signals is carried out. This transit time measurement is executed by way of the organization channels for operationally-ready radio subscriber devices and in the voice channels for radio subscriber devices involved in a call, the latter upon the use of the measurement receiver of the radio base stations.

3 Claims, 9 Drawing Figures

MOBILE RADIO NETWORK

BACKGROUND OF THE INVENTION

1. Field of the Invention

The present invention relates to a mobile radio network comprising a plurality of base stations in a mutual three-dimensional arrangement in the manner of a cellular system, wherein a respective, rigidly prescribed plurality of radio zones immediately adjacent to one another forms a radio zone group in which the frequencies channels available overall are repeated, and wherein: further, at least the radio organization-oriented signaling is undertaken in digital form between the stationary base stations and the mobile subscriber stations via organization channels designed for duplex operation and a measurement receiver having a control incorporated into the synchronous system of the base stations is provided in each of the base stations having a central control unit for radio data control.

2. Description of the Prior Art

A mobile radio network of the type generally set forth above in the German Pat. No. 30 12 484 C2, fully incorporated herein by this reference. A monitoring of the radio channels of neighboring radio regions thereby occurs by measuring field intensity and range and the storage of the field intensity values or of both values and the switching of mobile subscribers into another radio region occurs by way of a corresponding control.

A problem area arises in the design of the radio regions in that, on the one hand, the ground-bound radio propagation dependent on terrain and the nature of the built-up area leads to irregular field intensity distributions and the radio region boundaries but, on the other hand, the radio regions must be designed according to the distributions of the radio traffic density.

Since full coverage of the radio service must also be promoted, and this is particularly true in built-up regions, the manual overlaps of the radio regions resulting from the field intensity distribution are unavoidable in any case.

The parameters of radio propagation are given by the mean attenuation over a radio link section, which is the function of the frequency f, of a range E, of the terrain undulation and of the antenna height, by the log-normal distribution which indicates the locus-dependent fluctuations from the mean attenuation over a radio range section conditioned by the topographical structure of the terrain, as well as its vegetation and building, as well as by the Rayleigh fading which occurs as a consequence of the vehicle movement when traveling through the positional distributions arising on the ground due to multi-path propagation and leads to brief Rayleigh-distributed drops of the receivable field intensity.

In addition to the mean attenuation over a radio link section, therefore, the log-normal distribution and the Rayleigh fading must also be taken into consideration for the definition of the boundary of the service region of a radio region. For the log-normal distribution, therefore, an addition of about 15 dB for 95% local probability must be taken into consideration in accordance with the desired fringe service in the service region.

When a fringe servicing of 95% is required in a cluster region supplied with small zones and having ultra-high traffic density within a radio region defined by the traffic density, then the 50% coverage lines and the 5% coverage lines considerably transgress the service region. Mutual overlapping of field intensity service regions are unavoidable.

An optimum reuse of the available radio channels must be achieved for economical radio coverage of large cluster regions. This leads to the minimum number of necessary radio bases and to the highest channel group size within the individual radio regions.

It is meaningful, in order to achieve a favorable economic structure, to distribute the existing channel volume to a minimum number of radio zones. However, the fact is that an overshooting of the entire cluster already occurs with relatively high probability given a distribution to seven radio zones and, therefore, a high probability of common-channel interference also exists. The conditions do not change decisively, even for the less efficient distribution for more than seven radio zones. Due to this property of field intensity distribution, the measures that are inherent in a system and possible for achieving minimum common-channel interference, given the maximally-possible reuse of the radio channels, must be exhausted, particularly in small zones.

The possible, system-inherent measures for minimizing the common-channel interference, which serve exclusively for the purpose of minimizing the reuse intervals, point to exclusively employing channels only within the radio zones to be covered with respect to traffic and of suppressing their use in externally-disposed overlap regions, regardless of the signal quality attainable in such regions.

Since apparatus expense is necessary at the stationary side for the realization of the system-oriented measures, it is meaningful to employ the same only in cases of critical traffic density. The critical traffic density is reached when all available channels, within a radio zone group of seven radio zones having a maximum radius, must be assigned. Then a necessity of repeating all channels, even in the neighboring radio zone groups, exists. Noticeable, mutual overlaps which lead to common-channel interference thereby already appear as a consequence of the topographical irregularities of the terrain.

Common-channel interference is still definitely negligible insofar as the use of the channels in rural regions only occurs in traffic centers and the traffic density decreases greatly toward the fringes of the radio zones and in the overlap region. However, as soon as an approximate homogeneous traffic distribution appears in large-area industrial regions or suburban regions, the probability of common-channel interference necessarily rises given the same mean traffic density.

When the traffic density rises above the critical value, then, since all radio channels are already assigned, the only thing that can be done is to reduce the radii of the radio zones in order to achieve a higher service density. With the diminution of the radio zone radii, however, the transmission powers are also reduced in order to reduce the area coverage with respect to field intensity. In order to thereby reliably exclude coverage gaps, the transmission powers may not be reduced proportionally to the radii. The probability of common-channel interference therefore increases.

The boundaries of the radio zones can thereby fundamentally not be fixed in accordance with the respective irregularity of the coverage, but must be dimensioned in accordance with the traffic density, depending upon the available channel capacity. It is therefore necessary to be able to detect the service boundary of radio zones that is defined with respect to traffic.

Fundamentally, there are three types of radio zone boundaries that must be detected with different means, namely the coverage-qualified radio zone boundary which, due to the topographical irregularities, is in no way a coherent simplex structure, the interference-qualified radio zone boundary which is defined by the minimum signal-to-noise ratio of the received signal, and the traffic-qualified radio zone boundary.

The traffic-qualified radio zone boundary is defined by a specific traffic volume which must be serviced with adequate service quality at all locations, particularly in cluster regions where small zones are required. The coverage given service areas are thereby used in a specifically restricted area corresponding to the traffic demands and the channel utilization in the mutual overlap regions is suppressed in order to minimize the common-channel interference.

SUMMARY OF THE INVENTION

The object of the present invention is to provide a mobile radio network having a traffic-qualified radio zone boundary which is best suited for the detection of radio zone boundaries.

The above object is achieved, according to the present invention, in such a fashion that a relative range measurement as a comparison of the distance of a mobile subscriber from two or more base stations and evaluation of the phase differences of their signals is carried out for the identification of the radio zone boundary of two neighboring radio zones as a criterion for switching mobile subscribers over to a different radio zone, this being carried out via the organization channels for subscriber devices that are operationally ready and by way of the voice channels upon use of the measurement receiver (radio location receiver) of the base stations for subscriber devices involved in a call.

The main advantage of the relative range measurement in the organization channel and in the voice channel lies in the identical action mechanisms and criteria which guarantees a congruent detection of the radio zone boundaries in both instances. The traffic-qualified parameters of the radio zone boundaries can therefore be defined and programmed in one operation. As a result of the congruence, the operationally ready subscriber device is always assigned to the correct radio zone (radio channel group). Over and above this, the radio subscriber device already perceives the absolutely correct radio zone belonging to the initial log on during the synchronization operation when it is switched on.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

The detection of use boundaries is guaranteed in the region of adequate reception quality solely by way of the range measurement. The range measurement can be executed as an absolute measurement whose most simple form is measurement of delay time whereby the signal delay time in the radio link hop is measured. The only thing thereby possible, however, is the definition of a uniform, directly-dependent range, so that only circular radio zones can be designed. An adequate solution of the above object cannot be achieved with the description of circles given variation of the traffic density and, therefore, of the radio zone radii, divergence of the traffic-qualified radio zones from the circular form and the coincidence of combinations of different radio zone sizes.

The absolute range measurement occurring under mobile conditions presumes that the signal communication between a base station and a radio subscriber device continuously exists. This, however, is only the case in the voice channels. The decision criterion is lacking for the great majority of radio subscriber devices in call readiness since the readiness mode in the organization channels does not emit of any absolute range measurement.

Given the present radio network, the detection of the traffic-qualified radio zone boundaries occurs by way of a relative range measurement wherein, in contrast to the absolute range measurement, the distance from two or more base stations is compared and the phase difference of their signals is evaluated in accordance with corresponding criteria. The relative range measurement permits the radio zone boundaries to all surrounding radio zones to be individually designed. The prerequisite for the accuracy of the phase evaluation is thereby the equiphase transmission of all signals to be interpreted. This means that the base stations must be synchronized with one another. This condition is met given synchronized operation cluster regions.

Figure 1:
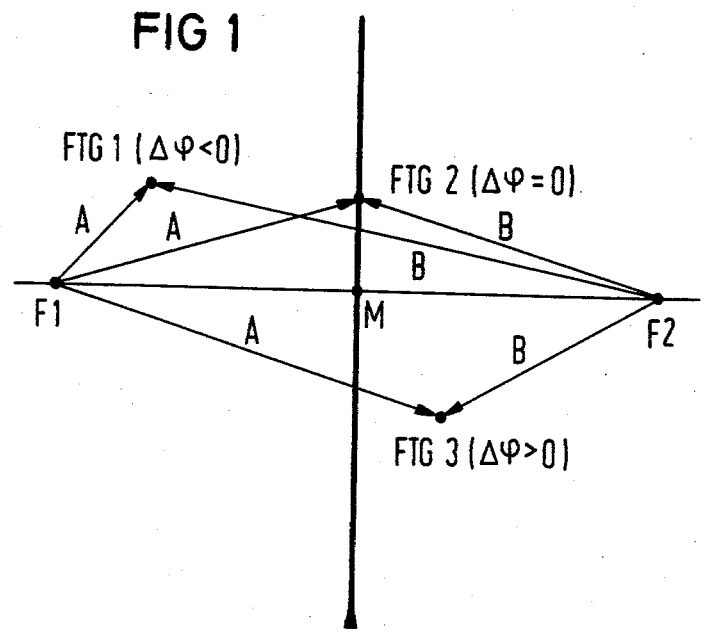
FIG. 1 is a vector diagram illustrating the phase difference evaluated by a radio subscriber device.
Figure 2:
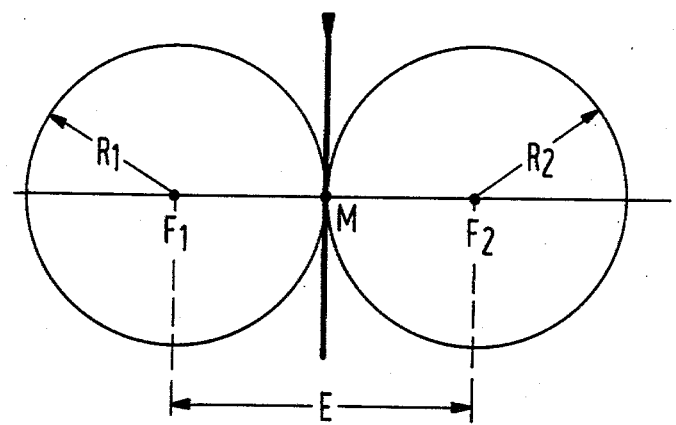
FIG. 2 is a geographic illustration of the center line given emission with identical radii for two adjacent zones.
Figure 3:
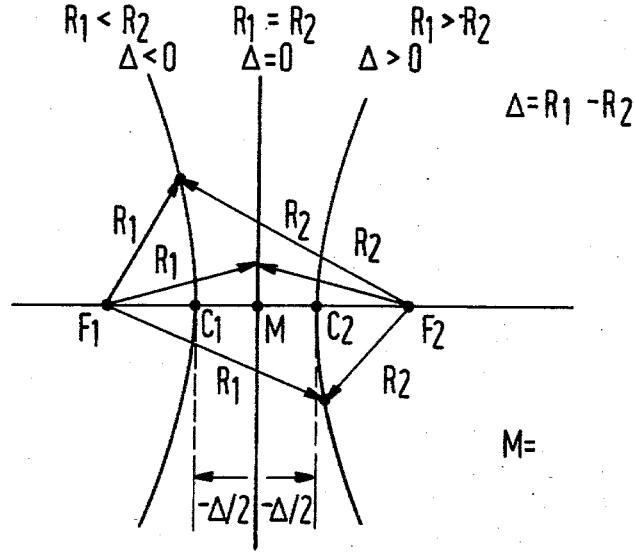
FIG. 3 is a geographic illustration of the position of a radio zone boundary with different evaluation radii.

The relative range measurement of the operationally-ready radio subscriber device which occurs over the organization channel shall be explained first with reference to FIGS. 1-3. Only the receiving mode is required given relative range measurement for the correct evaluation of the base station signal phases. This measurement can therefore be executed in complete independence by all operationally-ready radio subscriber devices which do not transmit in this condition. The time-divided organization channel, wherein all surrounding radio zones are evaluated on a single frequency, and further equivalent with the highest possible decision accuracy, is thereby advantageous.

The signals having the same reference phase which are transmitted by the base stations F1 and F2 and which contain the individual evaluation parameters of the radio zone typically arrive at the receiver of a radio subscriber device FTG located in a mobile station at different times depending upon the location of the radio subscriber device FTG. Phase coincidence prevails only when the radio subscriber device FTG is located precisely on the center line. In their signals, the base stations F1 and F2 transmit the evaluation radii R1 and R2 which have been programmed in and which correspond to their traffic-qualified radio zone boundary. They therefore place the radio subscriber device FTG in the position of evaluating the phase difference and also recognizing radio zone boundaries that diverge from the center line.

The radio subscriber device FTG is not in a position of evaluating the absolute transit time of the two signals. It only evaluates their difference independently of the transit time. In the case of identical radii signaling of the two base stations F1 and F2 for their radio zone radius R1 or, respectively, R2 (radius differential $\Delta=0$, i.e. the distance A is equal to the distance B, $\Delta\phi=0$ given the radio subscriber device FTG2 in the diagram of FIG. 2), this leads to the fact that the radio subscriber device FTG always detects the radio zone boundary in the center M between two base stations, regardless of actual range E (cf. FIG. 2).

As soon as two neighboring base stations transmit different evaluation radii, however, as is shown for the positions of the radio subscriber drives FTG1 and FTG3 in the schematic illustration of FIG. 1, the center point M is shifted toward the left or toward the right in accordance with the half the radii differential $$\Delta/2=(R1-R2)2$$

whereby the original center straightline is transformed into a hyperbola (cf. FIG. 3). The peaks of the hyperbolae are thereby referenced C1, C2. The centers of the radio zones, the base stations F1 and F2 at the same time are the foci 1, 2 of the hyperbolae. The geometrical formation mechanism for these hyperbolae shall not be discussed in greater detail at this time.

Figure 4:
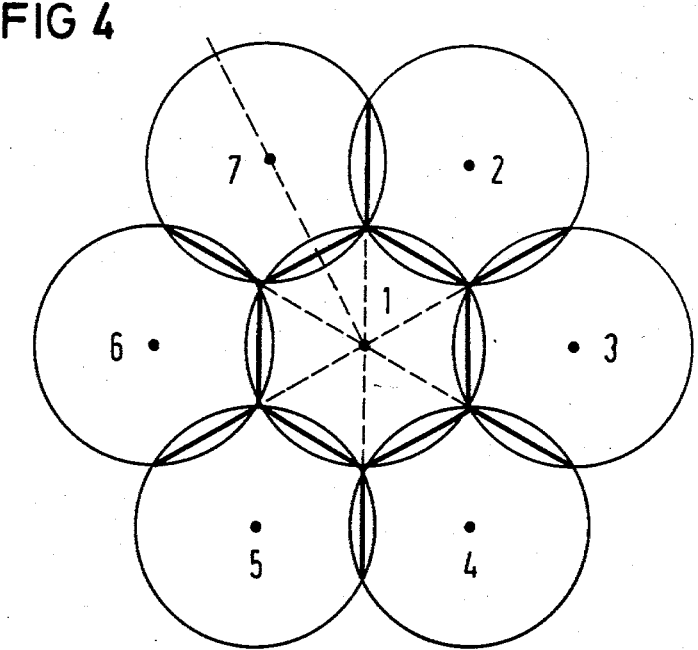
FIG. 4 is a geographic illustration of the application of the relative range measurement in regular radio zone groups.

FIG. 4 illustrates a radio zone group comprising a regular cluster of seven overlapping zones 1-7. Hexagonal radio zones that are shown in FIG. 4 with thicker lines are detected given application of the relative range measurement. The dot-dash line illustrate that the inner hexagon disappears and is automatically converted into a triangular distribution given outage of the center radio zone or intentional proximity assistance. The corresponding triangles shown in dot-dash in the original radio zone 1 are thereby co-serviced by the respectively neighboring radio zones.

The effective design of traffic-qualified radio zone boundaries with irregular radio zone sizes is also possible independently of their transmission power with the hyperbola information by way of relative range measurement.

Figure 5:
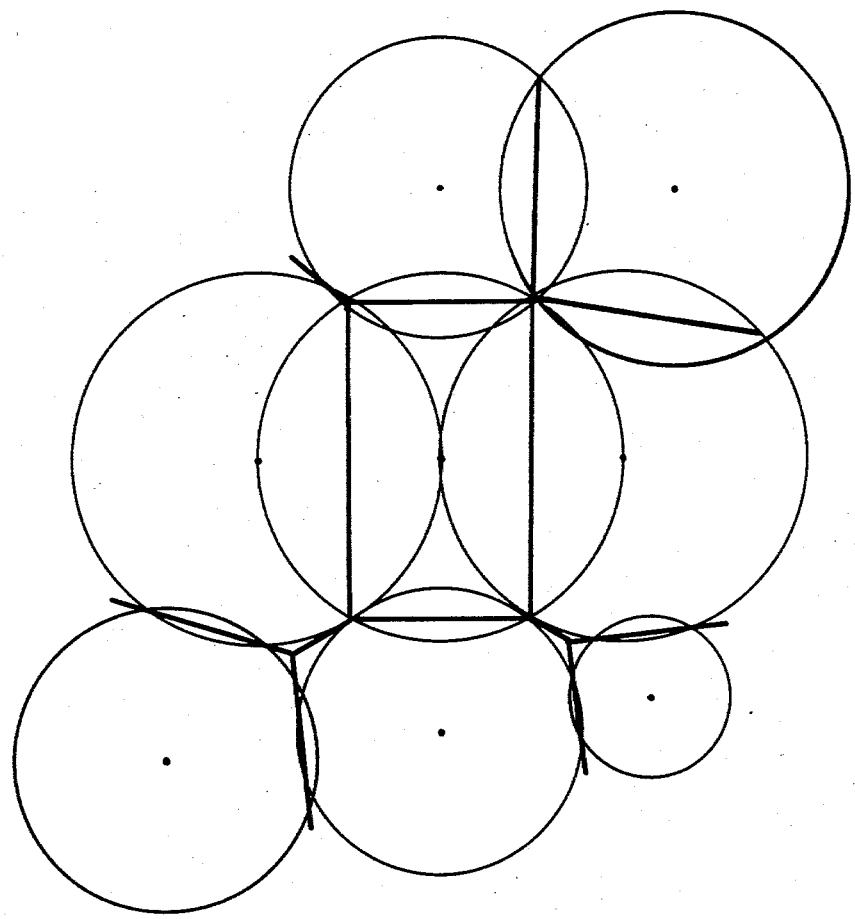
FIG. 5 is a geographic illustration showing the radio zone boundary in an irregular distribution having initial overlapping.

Radio zones greatly diverging from the regular hexagon can also arise given the irregular distribution of the base stations generally practiced and mutual overlap of the radio zones. FIG. 5 illustrates an example of this diversion from a regular hexagon with a quadrangular radio zone. The individual radio zone boundaries are again shown with heavy lines.

Figure 6:
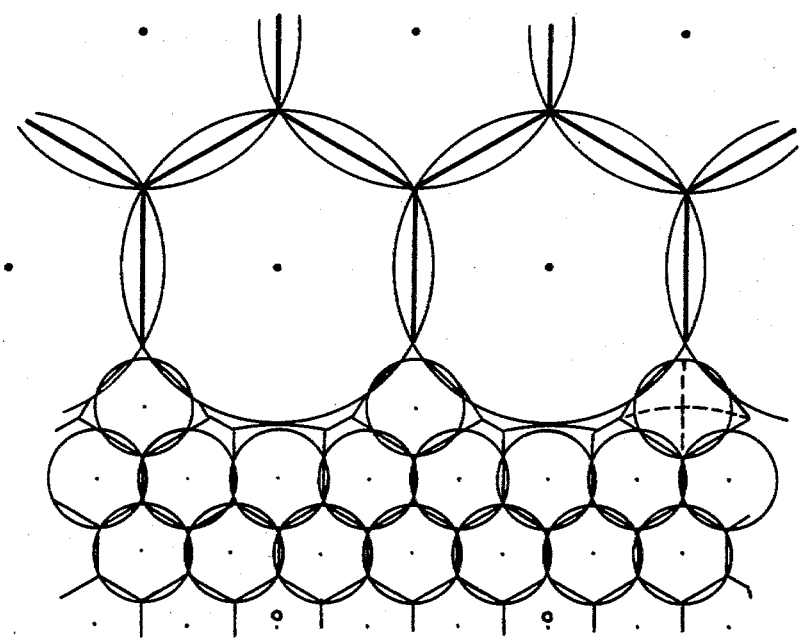
FIG. 6 is geographic illustration of the immediate transition from large zones into small zones.

The immediate transition from large zones to small zones represents a generally difficult case because of the field intensity distributions. The illustrative embodiment of FIG. 6, however, shows that this case can also be governed with the relative range measurement technique.

Figure 7:
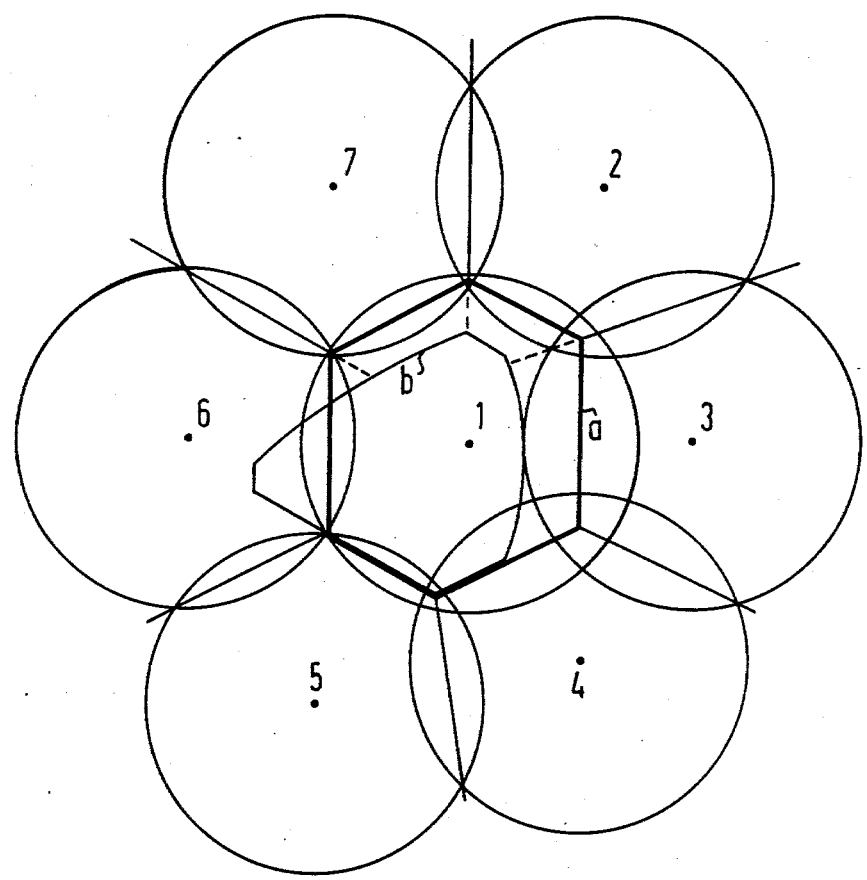
FIG. 7 is a geographic illustration of the individual radio zones shaping as a result of radio-zone-associated evaluation of the surrounding radio zones.

A further enhancement of the flexibility of radio zone design is possible in intractable cases in that specific base stations prescribe the radii evaluation of the surrounding base stations for the subscribers located therein, whereby the signaling can, for example, occur in the vacant calls. Asymmetrical radio zones, such as shown by a line b in FIG. 7 can be realized within broad limits with this measure. A size of 12, 19, 20, 12, 12, 4 or 18 km is thereby prescribed for the individual radio zones 1-7. The line a in FIG. 7 illustrates the radio zone given evaluation of the value signal by the neighbors. Such an individual radio zone design on the basis of radio-zone-associated evaluation of the surrounding radio zones is particularly advantageous for base stations in cluster regions.

The relative range measurement in the voice channels shall be explained with reference to the diagrams of FIGS. 8 and 9. The radio location receiver FME which serves the purpose of switching connections at the radio zone boundary is employed for the execution of the relative range measurement. It is a component of every base station and continuously executes measurements of field intensity on the channels assigned in the neighboring radio zones. When the field intensity in a channel exceeds the identification threshold, when, therefore, an adequate quality of reception is present, then the corresponding radio subscriber device FTG is identified. The range of the radio subscriber device is also determined within the framework of the identification. The call switching occurs according to various criteria, whereby the range presents one of the change-over criteria.

Figure 8:
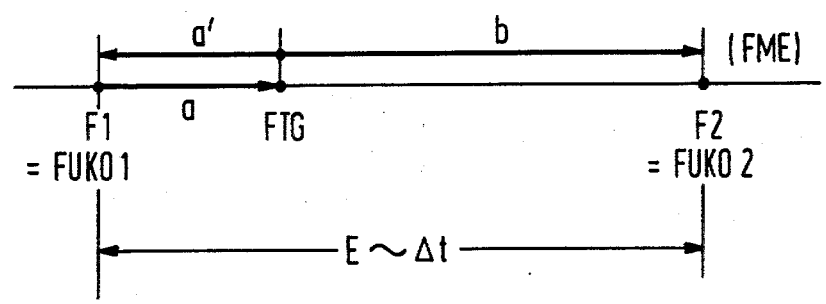
FIGS. 8 and 9 are vector diagrams showing the principle of relative range measurement in the voice channels.

FIG. 8 illustrates the principle of a relative range measurement with the radio location receiver. A base station F1 and a base station F2 are thereby provided, being disposed at a distance E from one another and having an absolutely identical reference phase. This is acquired by way of the reception of the organization channel of the base station F1 at the base station F2 upon consideration of the range E or, respectively, of the signal transit time $\Delta t$. The radio location receiver FME located at the base station F2 measures the transit time b of the phase signal of the radio subscriber device FTG in communication with the base station F1, the device FTG being located on the straight connecting line between the two base stations F1 and F2 in this example. When the device transit time arising in the radio subscriber device FTG is equated to zero or appropriately taken into consideration, then a signal emitted by the base station F1 reaches the radio subscriber device after a first transit time a and reaches the radio location receiver FME in the base station F2 after the second transit time b. The sum transit time $\Delta t$ fundamentally corresponds to the sum a+b. For the sum $\Delta t = a+b$, it is thereby inconsequential to what degree the radio subscriber device FTG changes its position on the straight line between the base stations F1 and F2, in that the sum remains constant. The range of the radio subscriber device FTG from the base station F2 cannot be determined solely from the transit time b at the base station F2.

Since, however, the signal of the radio subscriber device FTG is received by the first base station F1 with the transit time a' which corresponds exactly to the transit time a, the base station F1 can identify the absolute range of the radio subscriber device FTG from the relationship $\frac{1}{2}(a+a')=a$. The base station F1 signals the value of the transit time a to the radio subscriber device FTG which retransmits the same in the manner of a relay station. The radio location receiver FME in a second base station F2 therefore acquires the magnitude of a. The value a is now subtracted from the sum transit time $a+b=\Delta t$ in the radio location receiver FME and the actual transit time b or, respectively, the range of the radio subscriber device FTG from the second base station F2 is thus identified.

The method is also applicable for all locations outside of the connecting straight line between the base station F1 and the base station F2 in that the real range can be determined from the equation $(a+b)-a=b$ in all cases.

Figure 9:
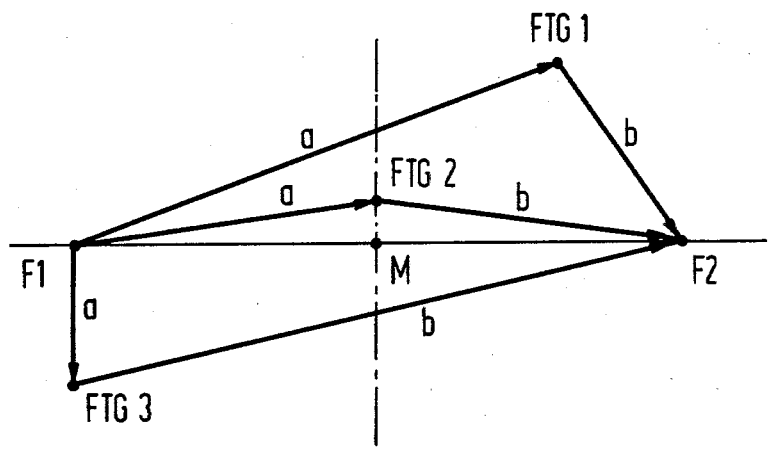

Various modifications are illustrated in FIG. 9 wherein the radio subscriber devices FTG1, FTG2 or, respectively, FTG3 are located outside of the straight line connection of the two base stations F1 and F2.

A comparison of the situation of the radio subscriber device FTG of FIG. 8 to that of FIG. 1 shows that the same action mechanism exists in both cases. The radio location receiver has the same information, namely the difference $a-b$, available in the voice channels as the radio subscriber device FTG has available in the organization channel and, given the assistance of the radius differential to other radio zones which is known in the base station, can therefore execute the relative range interpretation in the voice channels congruent with the operationally-ready radio subscriber devices FTG. The measurement receiver is thereby designed such that the range value of every connection is measured once, for example, in 10 sec on average.

When a radio subscriber device FTG transgresses the predefined radio zone boundary, then the corresponding radio location receiver initiates the transfer. The radio location receiver FME is in the position to initiate the transfer which, therefore, is a matter of an induced transfer because it also notes that corresponding base station and subscriber number from the call identification.

The induced transfer of the radio subscriber devices FTG when they reach the radio zone boundary is of great advantage because the inquiry at all surrounding base stations which is otherwise required given transfers is eliminated and, therefore, the data traffic is minimized as seen from this point of view.

When there is a path of such a nature that it leads along a radio zone boundary and leads to increased and confusing re-log-ons and transfers, then the situation can be alleviated by way of a small displacement of the programmable boundary parameters ($\Delta = R1 - R2$).

That a radio subscriber device that has just been changed over concludes its call due to a connection transfer and immediately logs on again on the basis of cleardown tolerances should be reliably prevented. It is therefore advantageous to lend the transfer somewhat larger radii in comparison to the re-log-on. This means that the transfer occurs chronologically delayed in comparison to the point in time which is specified on the basis of the evaluation criteria. Since this procedure must occur mutually between the radio zones, i.e. in both directions, a slight tolerance loop functioning as hysteresis for the transfer appears symmetrically around the re-log-on lines.

Although we have described our invention by reference to particular embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A mobile radio network comprising:
   a plurality of mobile subscriber stations;
   a plurality of base stations in a mutual three-dimensional cellular system arrangement defining a plurality of radio zones of which immediately adjacent zones form a radio zone group in which each of the number of frequency channels is repeated, and in which at least the radio organization-oriented signaling is performed in digital form between the base stations and the mobile subscriber stations via duplex organization channels;
   means for controlling transfer of mobile subscriber stations from one radio zone to another including means for performing a relative range measurement and comparing the distance of a mobile subscriber from at least two of said base stations and evaluating the phase differences of their signals for identifying the radio zone boundary of two neighboring radio zones as a criterion for transferring a mobile subscriber station to a different radio zone via the organization channel for an operationally-ready subscriber station and via the voice channel for a subscriber station engaged in a call;
   means in each of said base stations for transmitting, in the organization channel, equi-reference phase signals with respect to all the base stations and information unique to the respective transmission radius corresponding to the respective traffic qualified radio zone boundary; and
   means in each of said mobile subscriber stations for evaluating the transmission in response to the differences in transit time of the transmissions and the radii information so that the radio zone boundary is determined as a straight line centrally located between two base stations having identical transmission radii and a hyperbola with different transmission radii with the peak of the hyperbola being shifted towards one of the base stations with respect to the central line in accordance with half the difference between the radii.

2. A method of operating a mobile subscriber network of the type in which there is a plurality of mobile subscriber stations and a plurality of base stations in a mutual pre-dimensional cellular arrangement, in which a rigid-prescribed plurality of radio zones immediately adjacent one another forms a radio zone group in which the overall available frequency channels are repeated, in which at least the radio organization-oriented signaling is performed digitally between the base stations and the mobile subscriber stations via duplex organization channels, and in which each of the base stations comprises a measurement receiver having a control incorporated in the synchronous system of the base station, the method comprising the steps of:
   transmitting equi-phase signals from the respective base stations;
   performing a relative range measurement by receiving and comparing the distance represented by the signals from at least two base stations and comparing their phases to identify the radio zone boundary of two neighboring radio zones as a switching criteria by determining a first sum transit time of a signal between a first base station and a subscriber station and a second sum transit time between that subscriber station and a second base station with a radio location receiver and determining the distance between the first and second sum transit times as the relative range, determining the first sum transit time including transmitting a signal from the first base station to the subscriber station and retransmitting the signal from the subscriber station to the first base station, measuring, in the first base station, the round-trip transit time and dividing the same in half to provide one-way time, transmitting a signal including the one-way time to the subscriber station, and retransmitting the signal including the one-way time from the subscriber station to the second base station.

3. In a mobile radio subscriber network of the type in which there is a plurality of mobile subscriber stations and a plurality of base stations in a mutual three-dimensional cellular arrangement, in which a rigidly-prescribed plurality of radio zones immediately adjacent one another forms a radio zone group in which the overall available frequency channels are repeated, in which at least the radio organization-oriented signaling is performed digitally between the base stations and the mobile subscriber stations via duplex organization channels, and in which each of the base stations comprises a measurement receiver having a controller incorporated into the synchronous system of the base stations in each of the base stations, in which each of the base stations comprises a central control unit for broadcast data control, the improvement comprising:

means for identifying the radio zone boundary of two neighboring broadcast zones as a criterion for switching mobile subscribers into another broadcast zone including means for making a relative range measurement by comparing the distance of a mobile subscriber from at least two base stations and evaluating the phase difference of their signals;

for operationally-radial subscriber stations means for measuring the difference of the transit time of the signals of identical reference phases emitted by said base stations in the time slots of the organization channel and means for evaluating the signals of identical reference phase containing information concerning the radii corresponding to the traffic-conditioned radial zone boundary and detecting the radio zone boundary as a straight line in the center between two base stations for mobile subscriber stations given identical radii signaling and, given different radii signaling, detecting the radio zone boundary as a hyperbola whose apex is shifted in accordance with half the radii difference towards one or the other side of the center with respect to identical radii; and for mobile subscriber stations in operation, means for performing the relative range measurement in response to the radio signal transit time, comprising means for providing the sum of the transit time between the first base station and a subscriber station and between the subscriber station and a second, neighboring base station and means for identifying the range between the subscriber station and the second base station and between the subscriber station and the first base station in response to the difference of the sum transit time and the transit time of the signal between the subscriber station and the first base station.

* * * * *